A. BAYLER.
BUNG-EXTRACTOR.
No. 182,402.　　　　　　　　　Patented Sept. 19, 1876.
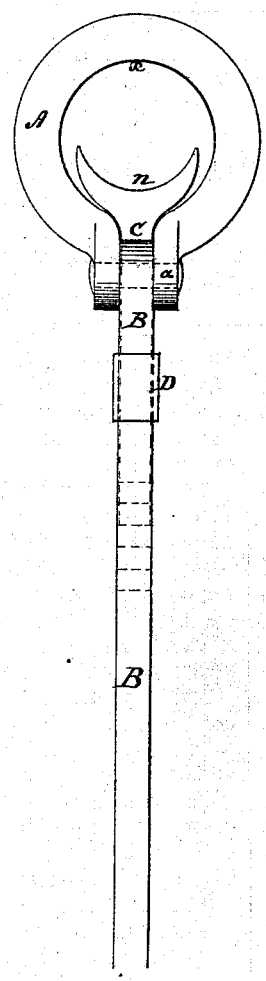
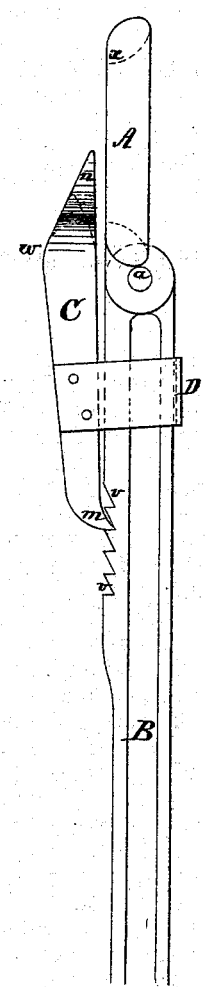
Witnesses.
John F. Allen
W. Ehret.
Inventor.
Adolph Bayler
per Henry & Roeder
Attorney

UNITED STATES PATENT OFFICE.

ADOLPH BAYLER, OF NEW YORK, N. Y., ASSIGNOR TO JOHN TRAGESER, OF SAME PLACE.

IMPROVEMENT IN BUNG-EXTRACTORS.

Specification forming part of Letters Patent No. 182,402, dated September 19, 1876; application filed July 26, 1876.

*To all whom it may concern:*

Be it known that I, ADOLPH BAYLER, of New York, in the State of New York, have invented a new and Improved Bung-Extractor, of which the following is a specification:

In the accompanying drawing, Figure I represents a top view of my improved bung-extractor, and Fig. II is a side view of the same.

At the end of a lever, B, of any desired length, a ring, A, is hinged, shaped in such a manner that the inner side, near the bottom, will form a sharp edge, as shown at $x$, Fig. II, capable of engaging the side of the bung. Below the lever B a lever, C, is arranged, attached to said lever B by means of a band, D, fitting loosely around the lever B, capable of allowing a slight oscillating motion to the lever C. The forward end $n$ of this lever C is provided with a circular cavity, forming a claw, while the after end $m$ is bent inward, forming a point to engage into the teeth $v$, provided on the under side of the bar B.

By the arrangement of the movable lever C, capable of sliding easily on the under side of the lever B, the opening between the end of the ring A and the end $n$ of this lever C can readily be increased or diminished to accommodate any size of bung, while the engagement of the point $m$ on the after end of the lever C into one of the notches or teeth $v$, as soon as the lever begins to operate on the bung, will prevent the moving back of said lever C, and insures a firm grip upon the bung between the edge $x$ of the ring A and the forward end $n$ of this lever C, the action of these teeth $v$ against the lever C causing the end of this lever to be pressed tight against the side of the bung.

To extract a bung with this tool, the ring A is passed over the bung so that the pointed edge $x$ of said ring engages one side of the bung. The lever C is then moved on the bar B until the claw $n$ acts on the opposite side of the bung. The bung being thus held fast between the edge $x$ of the ring A and the claw $n$ of the lever C, the pressing down of the bar B will extract the same. The raised part $w$ on the under side of the lever C acting as a fulcrum during this operation, while the action of the pointed end $m$ of the lever C into one of the teeth $v$ at the under side of the bar B prevents the moving of said lever C.

What I claim as my invention, and desire to secure by Letters Patent, is—

The bar B, provided with teeth $v$ at its lower surface, and a hinged ring, A, in combination with the lever C, having a circular cavity or claw, $n$, at one end and a pointed projection, $m$, at its other end, fitting into the teeth $v$, the whole being constructed and operating in the manner and for the purpose substantially as described.

ADOLPH BAYLER.

Witnesses:
 HENRY E. ROEDER,
 S. A. EMANUEL.